United States Patent

[11] 3,581,621

| | | |
|---|---|---|
| [72] | Inventor | Russell E. Bauer<br>Grosse Pointe, Mich. |
| [21] | Appl. No. | 746,130 |
| [22] | Filed | July 19, 1968 |
| [45] | Patented | June 1, 1971 |
| [73] | Assignee | KDI-Bauer Corporation<br>Warren, Mich. |

[54] ARMORED VEHICLE TURRET
6 Claims, 4 Drawing Figs.

[52] U.S. Cl. .................................................. 89/36,
89/37
[51] Int. Cl. ...................................................... F41f 21/16,
F41h 5/20
[50] Field of Search ........................................... 89/36, 36 T,
36.4, 37, 37 K, 37 F, 40, 40.11; 109/9, 58.5

[56] References Cited
UNITED STATES PATENTS

| | | | | |
|---|---|---|---|---|
| 1,747,142 | 2/1930 | Campbell ..................... | (89/36TUX) |
| 2,199,410 | 5/1940 | Lennon ........................ | 89/37(K) |
| 3,340,771 | 9/1967 | DeMeiss ...................... | (89/37KUX) |
| 3,478,643 | 11/1969 | Forsyth et al. ................ | 89/36(T) |

*Primary Examiner*—Benjamin A. Borchelt
*Assistant Examiner*—Stephen C. Bentley
*Attorney*—Hauke, Gifford and Patalidis ABSTRACT: An armored vehicle turret or cupola comprising a bullet impervious structure mounted for rotation about a vertical axis. The structure has a rectangular aperture which is obturated by a mantlet shaped as a hollow partially cylindrical shield journaled in the turret structure for rotation about a horizontal axis. The portion of the mantlet projecting from the rectangular aperture is provided with light firearm ports and mounting means and with a variety of ports and mounting means for diverse devices adapted to discharge liquids or gases to the exterior of the vehicle. The mantlet is spring equilibrated in such manner that it can easily be actuated in elevation by simple manual means.

PATENTED JUN 1 1971  3,581,621

INVENTOR
RUSSELL E. BAUER

BY Hauke, Gross, Gifford, & Patalides

ATTORNEYS

ARMORED VEHICLE TURRET

BACKGROUND OF THE INVENTION

The present invention relates to armored vehicles in general, and more particularly to light armored vehicles for use in police work, civil disorder control, riot control, and the like, although the principles of the present invention could very well be adapted to light armored vehicles for guerrilla warfare and the like. More particularly, the invention is concerned with light armored vehicle turrets or cupolas for the purpose of providing a support for firearms and other devices, which can be easily rotated relatively to the body of the vehicle and wherein the firearms and other devices may be effortlessly elevated, using solely the manual power of an operator standing or sitting in the vehicle with his head and shoulders within the turret.

SUMMARY OF THE INVENTION

The present invention provides a light armored vehicle turret affording an orientable mount for conventional light firearms, providing substantial protection to the operator of the turret and firearms from the type of projectiles generally used in instances of civil disorder, riots and the like, such as rifle bullets, hand weapon bullets, rocks and bricks, "Molotov cocktails" and the like. In addition, the invention provides an orientable mount for diverse defensive devices of the nonlethal category, such as tear gas, grenade throwers, grenade launchers, tear gas dispensers, water sprayers and the like. In addition, a light armored vehicle equipped with the turret of the invention also provides for some limited firefighting capabilities, as water nozzles and water sprayers may be mounted on the turret, thus providing a light firefighting vehicle affording armored protection to firefighting personnel.

A preferred embodiment of the invention is hereinafter described in details by way of example with reference to the appended drawings, in which:

DESCRIPTION OF THE PREFERRED EMBODIMENT

Figure 1:
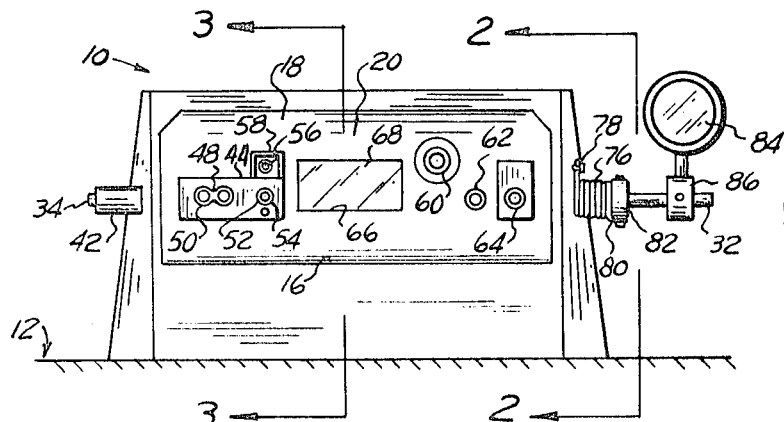
FIG. 1 is a front elevation view of a turret according to the present invention.

As shown in FIGS. 1—4, an example of turret according to the present invention, and as shown generally at 10, is normally mounted on a top surface of a light armored vehicle body, a portion of which is shown generally at 12. The turret 10 is mounted for rotation about a vertical axis, and is made, for ease of fabrication in the example shown, of light armor plate portions appropriately welded together so as to form an enclosure 14. Obviously the turret structure or enclosure may alternately consist of an appropriately shaped cast shell, if so preferred.

The turret structure 14 has a substantially rectangular aperture 16, having its longer sides disposed in planes perpendicular to the axis of rotation of the structure, and normally obturated by a mantlet 18. The mantlet 18 is shaped as a hollow partial cylinder having an arcuate cylindrical wall 20, protruding through the rectangular aperture 16, and provided with flat sector-shaped end walls 22 and 24 on both ends thereof. The sector-shaped end walls 22 and 24, in the shape of approximately half a circle, are appropriately welded at the end edges of the arcuate cylindrical wall 20, as shown, and the upper edge 26 and lower edge 28 of the arcuate cylindrical wall 20 normally project within the enclosure or structure 14, the lower edge 28 being preferably provided with a ramp or bar 30 welded thereon for ease of manipulation of the mantlet and for affording protection to the occupants of the turret against the sharp edge of the mantlet. The sector-shaped end walls 22 and 24 are provided each with a trunnionlike stub shaft, as shown respectively at 32 and 34, passed through an appropriate opening in each sector-shaped end wall and held fixedly therein by welding, clamping, set screws or any other appropriate means.

Figure 4:
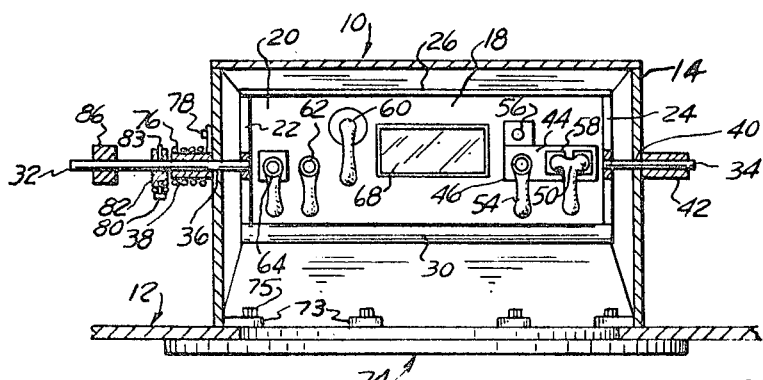
FIG. 4 is a sectional view thereof from line 4-4 of FIG. 2.

Stub shaft 32 passes through a hole 36 in a sidewall of the turret structure 14, as best shown in FIG. 4, and is adapted to journal within the bore of a bushing 38 welded on the outside thereof in alignment with such hole 36. Stub shaft 34 projects through a hole 40 in an opposite sidewall of the turret structure 14 and is adapted to journal within the bore of a bushing 42 also welded on the outside of such sidewall. Bushings 38 and 42 are horizontally axed, for a normal position of the vehicle, and the arcuate cylindrical wall 20 of the mantlet 18 slidably fits the rectangular opening or aperture 16, such that the mantlet may be angularly positioned in elevation.

The forward portion of the arcuate cylindrical wall 20 is provided with a plurality of ports and mounts so as to carry diverse weapons and other devices as may be required. In the example illustrated, the arcuate cylindrical wall 20 of mantlet 18 is provided with a projecting boxlike structure 44, also made of armor plate, and welded over an aperture 46 (FIG. 1 and 4) substantially equidistant from the upper edge 26 and the lower edge 28 of the arcuate cylindrical wall 20. This boxlike projection 44 has a port 48 shaped to accept the muzzle of a double-barrel shot gun 50, and a second circular port 52 adapted to receive the muzzle of a rifle 54. The rifle 54 is provided with a telescopic sight 56 partly projecting from the arcuate cylindrical wall 20 and protected by a visorlike enclosure 58. Mounting and clamping means, as shown at 58 in FIG. 4, are provided within the boxlike structure 44 to afford an adjustable mount for the firearms which are normally mounted with their line of sight aligned along a radius of the mantlet 18 about its axis of rotation defined by stub shafts 32-—34. Additional ports may also be provided on the forward portion of the arcuate cylindrical wall 20 of the mantlet 18, such ports being provided with appropriate mounting means for devices such as, as shown, a tear gas nozzle 60, a high velocity water nozzle 62, and a high velocity water sprayer 64, such devices being obviously nonlethal defensive devices for controlling unruly crowds, the water nozzle 62 and sprayer 64 further presenting the advantage of permitting the vehicle equipped with the turret of the invention to be used for firefighting to the limit of the water carried in the vehicle in appropriate tanks.

The mantlet 18 is further provided with an appropriate aperture 66 in which is fitted a vision block 68 made of bullet turret glass so as to enable the occupant of the turret to visually observe in the line of fire of the turret. The turret structure 14 may be provided, as shown, with additional apertures fitted with vision blocks, as shown at 70, which for a turret structure of small size, are preferably arranged such that the substantially thick glass blocks of the vision blocks project to the outside of the structure so as not to decrease the inner volume of the turret structure.

Figure 3:
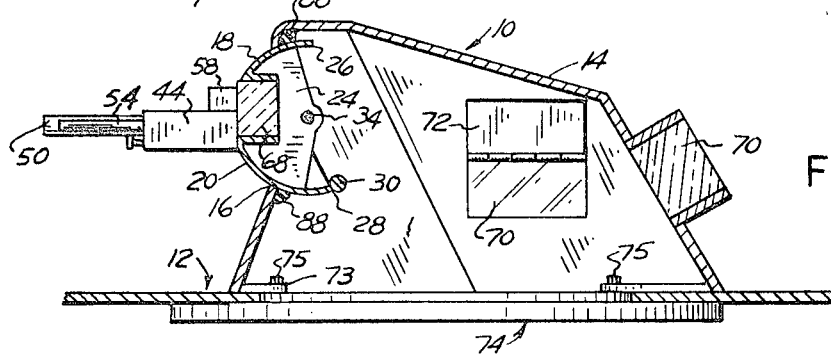
FIG. 3 is a sectional view thereof from line 3-3 of FIG. 1.

As shown in FIG. 3, each window of the turret having a vision block 70 is also preferably provided with a hinged shutter 72 disposed within the turret structure 14 and which is adapted to be dropped over the vision block and latched in such position in the event that the vision block becomes broken or damaged, or for affording additional protection to the occupant of the turret.

As shown in FIGS. 3 and 4, the turret structure 14 is placed over an aperture in the body 12 of the vehicle and is provided with welded-on internal brackets 73 for fastening to a roller track 74, by way of bolts 75, such as to be rotated relatively to a vertical axis of the vehicle when in normal position.

Figure 2:
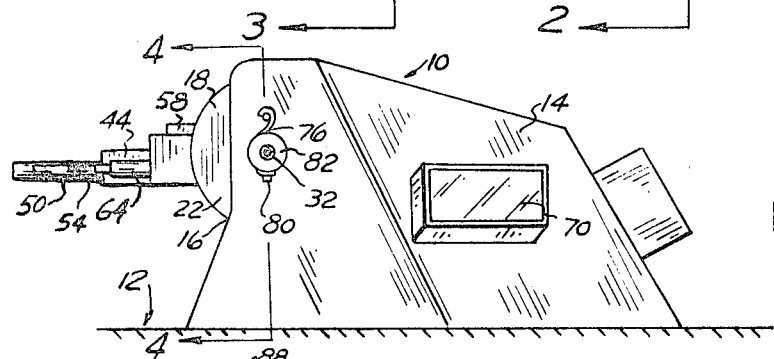
FIG. 2 is a side elevation view from line 2-2 of FIG. 1.

As best shown in FIGS. 1, 2 and 4, the partly cylindrical mantlet 18 is counterbalanced by simple means preferably comprising a coil spring 76 surrounding one of the mantlet journal bushing, such as bushings 38, and having one end provided with a loop fastened to a sidewall of the turret structure 14 by way of a pin or bolt 78, and having another end projecting beyond bushing 38 attached by way of a pin or bolt 80 to a collar 82 adjustably clamped by means such as setscrews 83, FIG. 4, to the stub shaft 32. By proper angular adjustment of collar 82 a predetermined torque or biasing preload can thus be exerted upon stub shaft 32 and consequently upon the mantlet 18 mounted thereon, such that the mantlet weight and the weight of the firearms and other devices mounted on the mantlet may be effectively equilibrated with the result that only simple manual means may be used for properly orienting the mantlet in elevation, the stub shafts supporting the mantlet 18 for rotation about a horizontal axis. Stub shaft 32 is preferably of a length sufficient to project beyond collar 82 for permitting mounting upon such projecting portion further accessories such as, for example, a spotlight 84 shown in FIG. 1, clamped on stub shaft 32 by means of a clamping collar 86. The spotlight 84 may thus be adequately aimed in the direction of aiming of the weapons and other devices mounted on the mantlet.

Adequate sealing means are preferably disposed, as shown at 88 at FIG. 3, along the edges of rectangular aperture 16 in the turret structure 14, such sealing means being in the form of rubber gaskets and the like so as to provide an effective seal between the movable mantlet 18 and the aperture edges. The principal object for providing such sealing means is to afford the occupant of the turret protection against seepage of inflamed liquid, such as inflamed gasoline.

It can thus be seen that the present invention provides a simple arrangement of elements for a manually operated turret for a light armored vehicle, and the illustrative example of an embodiment of the invention has been given here for illustrative purpose only, and not in the limiting sense.

What I claim is:

1. A turret for an armored vehicle and the like comprising a boxlike structure mounted on said vehicle for rotation about a vertical axis of said vehicle when in a normal position, a rectangular aperture disposed in said structure and having its longer sides in planes perpendicular to said vertical axis, a hollow partly cylindrical mantlet journaled in said structure for elevation about an axis parallel to the longer sides of said rectangular aperture, said mantlet fitting slidably in said aperture and having an arcuate cylindrical wall having upper and lower edges and partially projecting from said aperture with said edges disposed within said structure, sector-shaped end walls closing said arcuate cylindrical wall on both lateral ends thereof, said mantlet being journaled in said structure by means of a stub shaft axially disposed to said mantlet on each end wall thereof and projecting through a bushing affixed to said structure, firearms ports through the walls of said mantlet substantially intermediate the edges thereof, means for supporting and clamping firearms with the muzzles thereof projecting from said mantlet in alignment substantially with a radius of said mantlet, and adjustable biasing means for counterbalancing said mantlet comprising a coil spring concentrically disposed around one said bushing and having an end fixedly attached and another end attached to a collar disposed around a portion of said stub shaft projecting from said bushing, said collar having means adapted to immobilize said collar upon said stub shaft in any appropriate angular position causing a winding of said coil spring applying on said stub shaft a torque counterbalancing the weight of said mantlet.

2. The turret of claim 1 further comprising ports and support means in said arcuate cylindrical wall for mounting water nozzles in alignment with a radius of said mantlet.

3. The turret of claim 1 further comprising a port and support means in said arcuate cylindrical wall for mounting a telescopic sight aligned with a radius of said mantlet.

4. The turret of claim 1 further comprising additional ports and support means in said arcuate cylindrical wall for mounting devices adapted to controllably discharge liquids or gases to the exterior of said structure.

5. The turret of claim 1 further comprising sealing means at the edges of the sides of said aperture and the surfaces of said arcuate cylindrical walls and said sector-shaped end walls for sealing the interior of said enclosure from the exterior.

6. The turret of claim 1 wherein at least one of said stub shaft projects exteriorly to said structure and further comprising a spotlight mounted on the projecting portion of said stub shaft.